Figure 1:
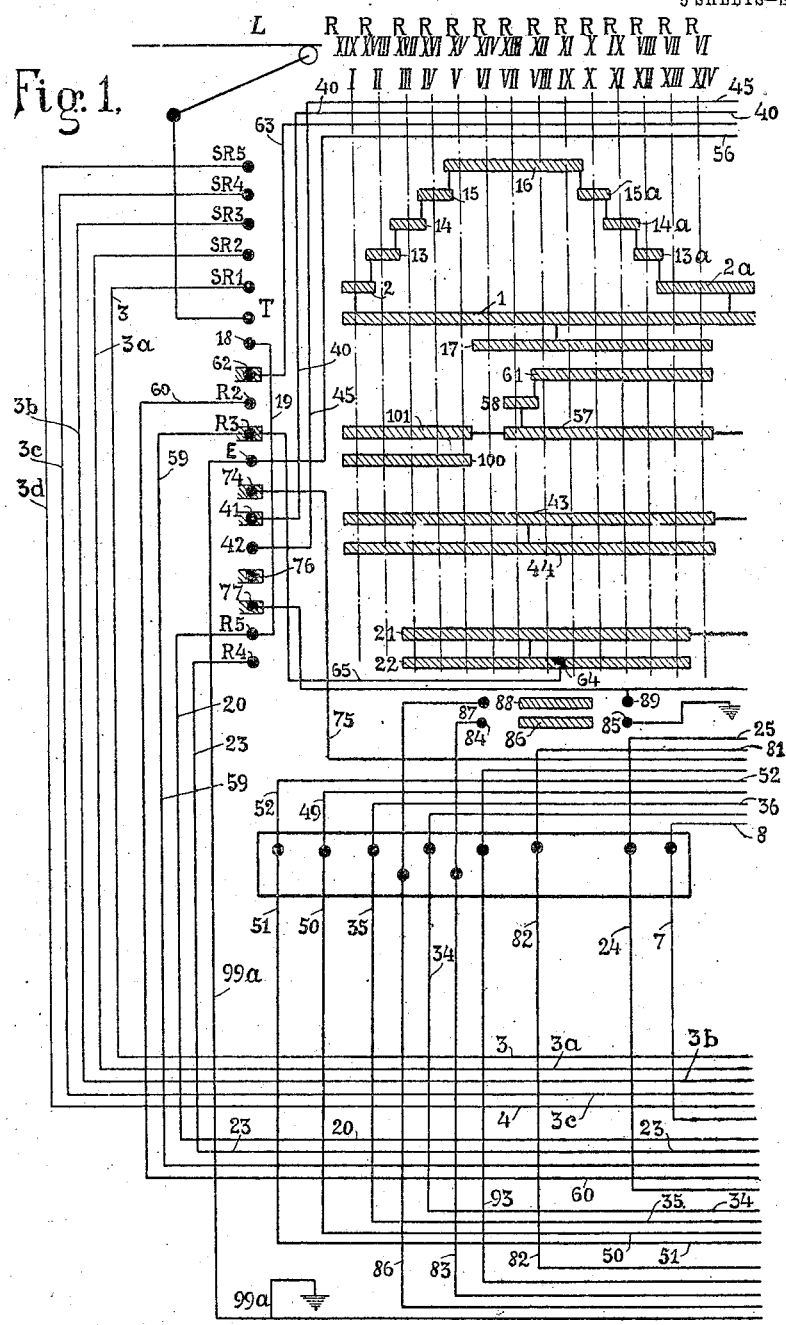

No. 849,749. PATENTED APR. 9, 1907.
J. S. RAWORTH.
CONTROLLER FOR ELECTRICALLY PROPELLED VEHICLES.
APPLICATION FILED JAN. 25, 1906.

5 SHEETS—SHEET 1.

No. 849,749. PATENTED APR. 9, 1907.
J. S. RAWORTH.
CONTROLLER FOR ELECTRICALLY PROPELLED VEHICLES.
APPLICATION FILED JAN. 25, 1906.
5 SHEETS—SHEET 2.
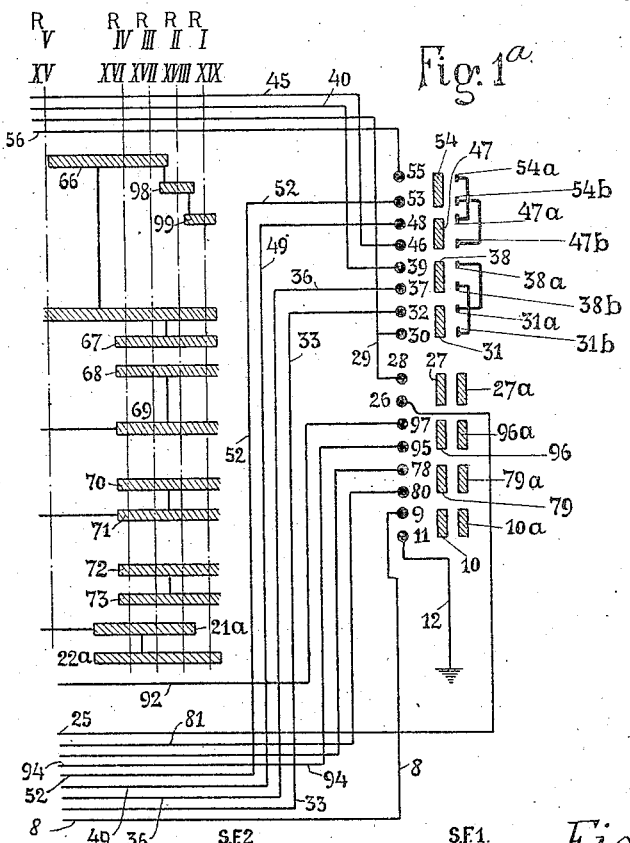
Fig. 1ª.
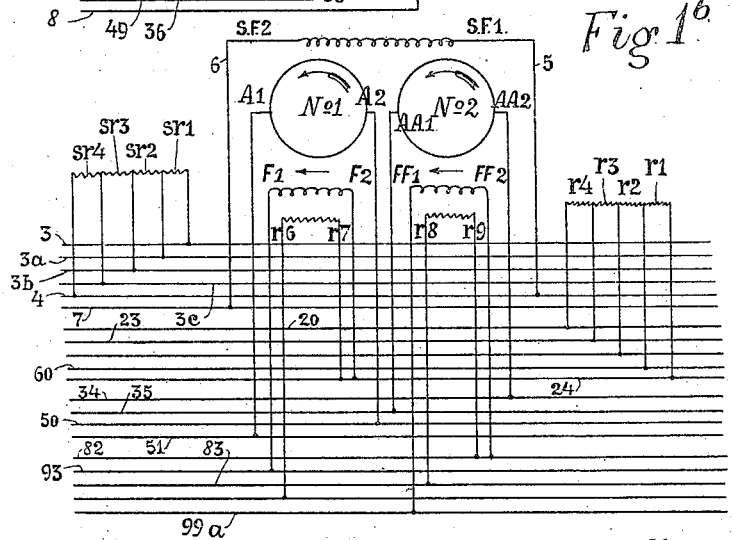
Fig. 1ᵇ.
Witnesses.
Inventor:
John Smith Raworth
By Townsend & Decker
Attorneys No. 849,749. PATENTED APR. 9, 1907.
J. S. RAWORTH.
CONTROLLER FOR ELECTRICALLY PROPELLED VEHICLES.
APPLICATION FILED JAN. 25, 1906.
5 SHEETS—SHEET 3.
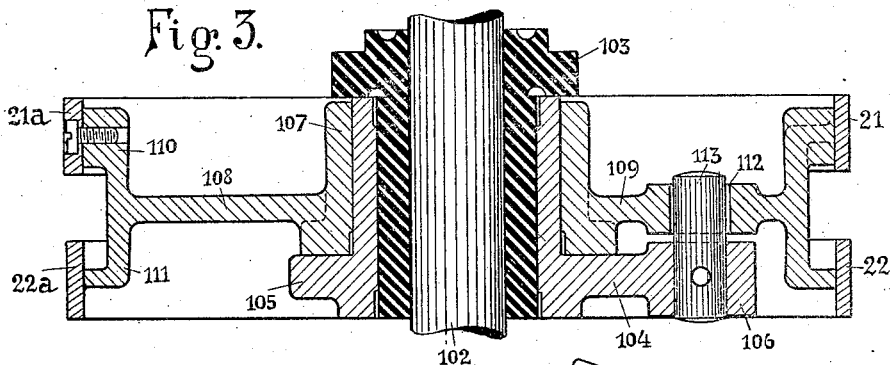
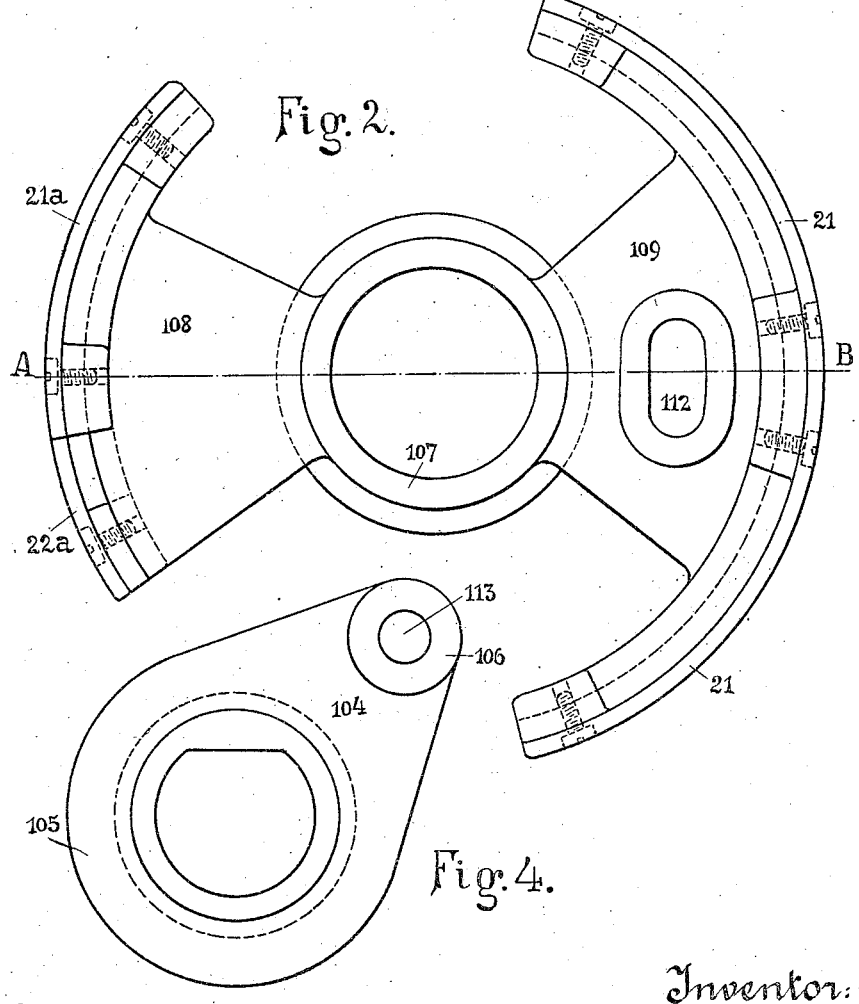
Witnesses:
Inventor:
John Smith Raworth
By Townsend & Decker
Attorneys No. 849,749. PATENTED APR. 9, 1907.
J. S. RAWORTH.
CONTROLLER FOR ELECTRICALLY PROPELLED VEHICLES.
APPLICATION FILED JAN. 25, 1906.
5 SHEETS—SHEET 4.

Witnesses:
Inventor:
John Smith Raworth
By Townsend & Decker
Attorneys.

No. 849,749. PATENTED APR. 9, 1907.
J. S. RAWORTH.
CONTROLLER FOR ELECTRICALLY PROPELLED VEHICLES.
APPLICATION FILED JAN. 25, 1906.

5 SHEETS—SHEET 5.

UNITED STATES PATENT OFFICE.

JOHN SMITH RAWORTH, OF STREATHAM, ENGLAND.

CONTROLLER FOR ELECTRICALLY-PROPELLED VEHICLES.

No. 849,749. Specification of Letters Patent. Patented April 9, 1907.

Application filed January 25, 1906. Serial No. 297,814.

*To all whom it may concern:*

Be it known that I, JOHN SMITH RAWORTH, a subject of the King of Great Britain and Ireland, residing at Streatham, in the county of Surrey, England, have invented new and useful Improvements in Controllers for Electrically-Propelled Vehicles, of which the following is a specification.

This invention is for an improved controller combined with an arrangement of circuits, resistances, and field-windings, some parts of which have been described in the specification of prior Letters Patent, No. 774,494, dated November 8, 1904, granted to me.

In the improved controller, the subject of this invention, the arbor is vertical, as is usual in controllers at present existing in connection with electric tram-cars, and the fixed and moving contacts and magnetic blow-outs are also similar.

The field-magnets of the motors are compound wound—that is to say, there is a shunt or separately-excited circuit and there is a series circuit, the latter being used when the motors are in parallel to balance the load between the motors, and it may be arranged with resistances in parallel under the above conditions, the resistances being cut out when the series field is used in connection with the emergency or braking circuit.

The principal feature of this improved controller is to make changes from motors in series to motors in parallel, and vice versa, though it may be used in a simpler form for motors which are designed to work always in series or always in parallel.

The operation of changing from series to parallel involves a cycle of operations, as follows: (*a*) The armature-circuit is broken; (*b*) the field strength is increased approximately as one to two; (*c*) a resistance is inserted in the armature-circuit in the interval which occurs while the motors are being changed from series to parallel; (*d*) the parallel connections are made; (*e*) the resistance aforesaid is cut out.

In changing back from parallel to series the following operations are necessary: (*a'*) The armature-circuits are broken; (*b'*) the field-current is reduced sufficiently to give a field strength of one-half or thereabout; (*c'*) a resistance is inserted in the armature-circuit; but this resistance is considerably greater than that described above as necessary when going into parallel; (*d'*) the series connections are made; (*e'*) the resistance aforesaid is cut out. The peculiarity of these cycles is that they are not reversible. Moreover, the resistance inserted in going into series must be greater than when going into parallel. These changes in the sequence of the operations are preferably brought about by the employment of a floating ring or rings on the controller-barrel, which ring or rings will hang back when the barrel is moved in either direction, but will be picked up and moved with the barrel after a certain interval. By this means the sequence of events in the forward and backward cycles is altered. The sequence may be altered by other means, though not so simply.

The field-contacts are carried on the same barrel as the power-contacts, but insulated therefrom. They may, if desired, be carried on a separate barrel geared with the power-barrel, and in such case the gearing may be either plain spur or it may be made more or less intermittent, so as to introduce periods of rest between periods of motion.

The controller is fitted with a reversing-barrel, by means of which all the changes in the connections of the motors for forward or backward motion are made; but these connections are not the same as in the ordinary series-parallel controller for series-wound motors. The shunt-field is unaffected by the reversing-switch, the armatures are reversed, and the series fields are dissociated from the armatures and again associated so as to maintain the same polarity as before.

In operating the controller the series of operations is as follows:

*Forward.*—0, all off; 1, shunt-field excited, resistance in circuit, armatures short-circuited through resistance; 2, shunt-field excited, less resistance in circuit, armatures short-circuited through resistance; 3, shunt-field excited, less resistance in circuit, armatures short-circuited through resistance; 4, shunt-field excited, less resistance in circuit, armatures short-circuited through resistance; 5, shunt-field fully excited, armatures short-circuited through resistance; 6, shunt-field fully excited, armatures in series with resistance in power-circuit; 7, shunt-field fully excited, armatures in series with less resistance in power-circuit; 8, shunt-field fully excited, armatures in series with less resistance in power-circuit; 9, shunt-field fully excited, armatures in series in power-circuit, (no resistance;) 10, resistance inserted in shunt field-circuit, armatures in series in power-circuit, (no resistance;) 11, more resistance inserted in shunt field-circuit, armatures in series in power-circuit, (no resistance;) 12, more resistance inserted in shunt field-circuit, armatures in series in power-circuit, (no resistance;) 13, more resistance inserted in shunt field-circuit, armatures in series in power-circuit, (no resistance;) 14, no change in connections; 15, armatures open-circuited and full shunt-field restored; 16, shunt-field fully excited, armatures in series with their series field-windings and in parallel with one another, resistance in power-circuit; 17, shunt-field fully excited, armatures in series with their series field-windings and in parallel with one another, no resistance in power-circuit; 18, resistance inserted in shunt field-circuit, armatures in series with their series field-windings and in parallel with one another, no resistance in circuit; 19, more resistance inserted in shunt field-circuit, armatures in series with their series field-windings and in parallel with one another, no resistance in power-circuit.

*Backward.*—1, resistance in shunt field-circuit, armatures in series with their series field-windings and in parallel with one another, no resistance in power-circuit; 2, less resistance in shunt-field circuit, armatures in series with their series field-windings and in parallel with one another, no resistance in power-circuit; 3, shunt-field fully excited, armatures in series with their series field-windings and in parallel with one another, no resistance in power-circuit; 4, no change in connections; 5, armatures open-circuited, all resistance inserted in shunt field-circuit; 6, armatures in series with resistance in power-circuit, shunt field-circuit as in 5; 7, armatures in series, no resistance in power-circuit, shunt field-circuit as in 5; 8, armatures in series, no resistance in power-circuit, less resistance in shunt field-circuit; 9, armatures in series, no resistance in power-circuit, less resistance in shunt field-circuit; 10, armatures in series, no resistance in power-circuit, less resistance in shunt field-circuit; 11, armatures in series, no resistance in power-circuit, shunt-field fully excited; 12, armatures in series with resistance in power-circuit, shunt-field fully excited; 13, armatures in series with more resistance in power-circuit, shunt-field fully excited; 14, armatures in series with more resistance in power-circuit, shunt-field fully excited; 15, armatures short-circuited through resistance, shunt-field fully excited; 16, resistance inserted in shunt field-circuit, armatures short-circuited through resistance; 17, more resistance inserted in shunt field-circuit, armatures short-circuited through resistance; 18, more resistance inserted in shunt-field circuit, armatures short-circuited through resistance; 19, more resistance inserted in shunt field-circuit, armatures short-circuited through resistance; 0, all off.

In the final "off" position the controller may be arranged so that the motor connections are open, or if it be desired to have an emergency or braking effect independent of the power-supply then the motors are left short-circuited through the series field-windings; but in such case the series field-winding has more turns in it than would be necessary merely for balancing the load; but the ampere-turns are reduced in such increased field-winding by shunt resistances placed in parallel with the series field-windings, but these resistances are cut out when the controller is in the emergency or braking position. The emergency brake is put in operation by reversing the relation of the armatures to the fields. This arrangement may also be used as a sketch to prevent running backward when ascending a grade by bringing the controller-handle to the off position.

Figure 5:
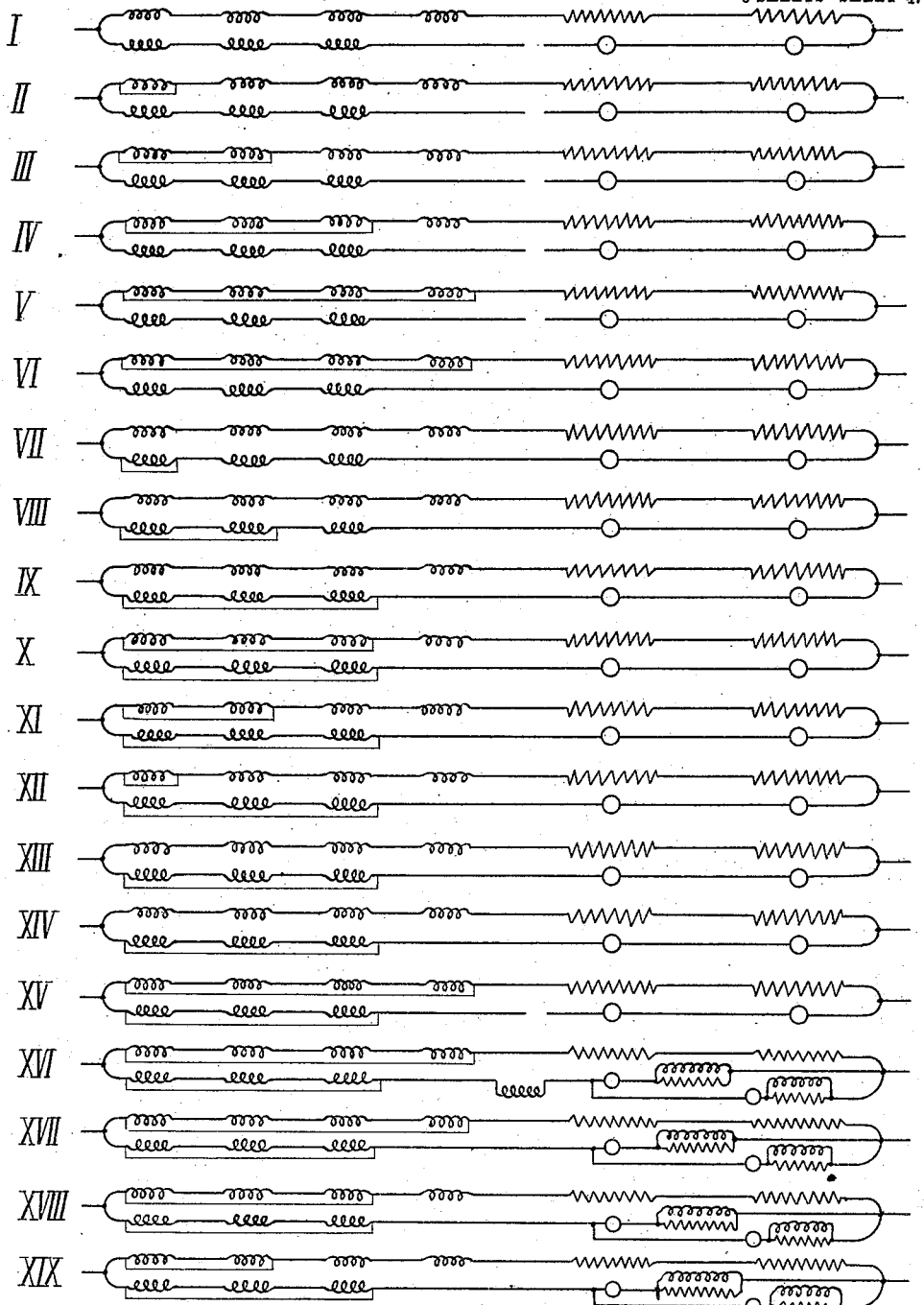
Figure 6:
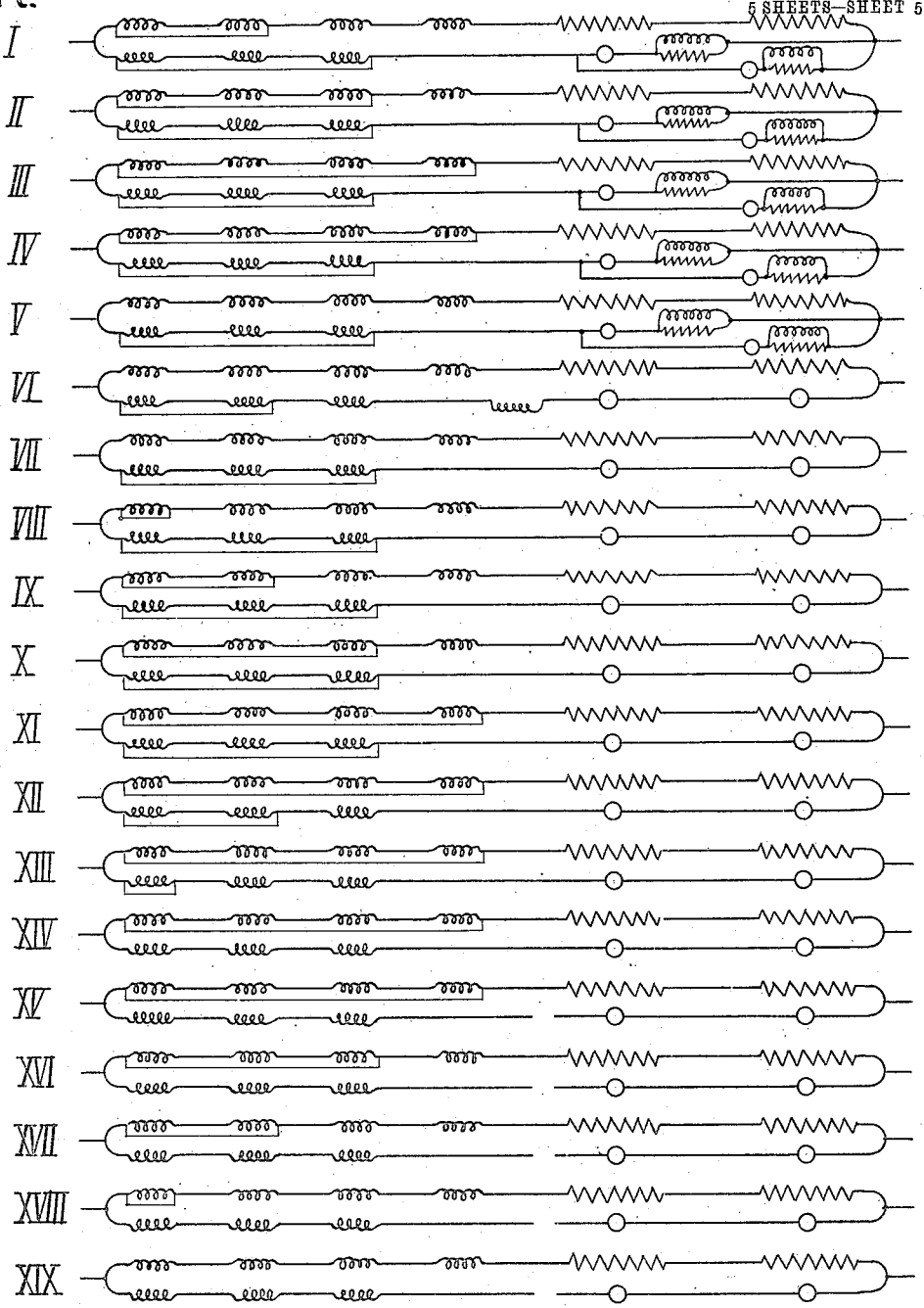

Figure 1, Fig. 1ª, and Fig. 1ᵇ of the accompanying drawings are a diagrammatic representation of the circuits, resistances, and field-windings of the motors and of the controllers on a tram-car in accordance with this invention. Only the wiring of the controller at one end of the car is shown; but it will be understood by those skilled in the art to which this invention relates that a tram-car intended to be controlled from either end is provided with a controller at each end. Fig. 2 is a plan of the floating ring, and Fig. 3 a cross-section on the line A B of Fig. 2. Fig. 4 is a plan of the operating-arm of the floating ring. Figs. 5 and 6 show in detail the various circuit connections between the armature and the field windings of the motors and the resistances at the different positions or notches on the controller. Fig. 5 shows the circuit connections when the controller is moved from the off to the on position, and Fig. 6 the circuit connections when the controller is moving from the on to the off position.

Let it be assumed that the car is at rest. In this condition all connection with the source of supply is broken, and the armatures may be in one of two conditions—*i. e.*, their connections are open or they are short-circuited through the series field-windings. In the latter case the connection of the armatures with the series field-windings is such that the motors will act as generators, and therefore as brakes, should the tram-car start in a backward direction by reason of any circumstance not under the control of the driver. The connections of the motors to obtain this latter condition will be fully described hereafter.

First, let it be assumed that the controller-handles have been so placed that the motors will be connected up and have an emergency or braking effect. In this position of the controller-handles all connection with line is broken, and the reversing-barrel is in such position that the relationship of the armatures to the fields under normal running conditions is reversed. The driver now receives the signal to start. However, before he can set the car in motion in a forward direction, he must reverse the relationship of the armatures to the fields, and this he does by moving the handle of the reversing-barrel from the "backward" to the "forward" position. The armatures are now short-circuited through a resistance, as will be hereinafter explained. The driver next moves the handle of the main barrel from the off position to position I. When the main barrel is moved to position I, the controller is connected with the source of supply—i. e., the trolley-wire L, assuming the tram-car is working over a route having an overhead equipment—by reason of the fact that a contact 1, carried by the main barrel, is moved onto a contact T, connected to the trolley. The contact 1 is the main or trolley contact and is always in contact with the contact T during the time that the controller is connected with the trolley-wire L. The contact 1 is connected electrically to a contact 2, that is carried by the main barrel, and is so placed as to be moved onto a contact SR′ at the same time as the contact 1 is moved onto the contact T. The contact SR′ is connected to the shunt field-windings of the motors, as also are contacts SR², SR³, and SR⁴ and SR⁵. The contacts SR′, SR², SR³, and SR⁴ control resistances $sr'$, $sr^2$, $sr^3$, and $sr^4$. When the main barrel is moved into position I, the field-circuit of the motors is closed and their magnets are excited; but the field excitation is not great, as in this position of the main barrel there is a considerable amount of resistance (resistances $sr'$ $sr^2$ $sr^3$ $sr^4$) in the shunt field-circuit, as will be seen by tracing the circuit, which is as follows: from the trolley-wire L to the contact T and from contact T by the main contact 1 to contacts 2 and SR′. The contact SR′ is connected by a lead 3 with one terminal of the resistance $sr'$ of the bank of resistances $sr'$ $sr^2$ $sr^3$ $sr^4$. The circuit is continued through all the resistances $sr'$ $sr^2$ $sr^3$ $sr^4$ and from the terminal of the resistance $sr^4$ by a lead 4 and a lead 5 to one terminal of the shunt field-windings SF′ SF² through these windings and from the other terminal thereof by leads 6, 7, and 8, contacts 9, 10, and 11 and lead 12 to earth. The contact 10 is carried by the reversing-barrel of the controller, as are also contacts 79, 96, 27, 31, 38, 47, and 54, hereinafter mentioned. To increase the excitation of the shunt-fields, the amount of resistance in circuit must be reduced. To do this, the main barrel is moved through positions II to V. In moving the main barrel from position I to position II, the resistance $sr'$ is cut out of circuit or short-circuited. This is effected by a contact 13, carried by the main barrel and connected electrically to the contact 2, and therefore to the main contact 1, being moved onto the contact SR². The contact SR² is connected by a lead 3ª with the terminal connecting the resistances $sr'$ and $sr^2$. In moving the main barrel from position II to position III the resistance $sr^2$ is cut out of circuit or short-circuited. This is effected by a contact 14, carried by the main barrel and connected electrically to the contacts 13 and 2, and therefore to the main contact 1, being moved onto the contact SR³. The contact SR³ is connected by a lead 3ᵇ with the terminal connecting the resistances $sr^2$ and $sr^3$. In moving the main barrel from position III to position IV the resistance $sr^3$ is cut out of circuit or short-circuited. This is done by a contact 15, carried by the main barrel and connected electrically to the contacts 14, 13, and 2, and therefore to the main contact 1, being moved onto the contact SR⁴. The contact SR⁴ is connected by a lead 3ᶜ with the terminal connecting the resistances $sr^3$ and $sr^4$. In moving the main barrel from position IV to position V the resistance $sr^4$ is cut out of circuit or short-circuited. This is effected by a contact 16, carried by the main barrel and connected electrically to the contacts 15, 14, 13, and 2, and therefore to the main contact 1, being moved onto the contact SR⁵. The contact SR⁵ is connected by a lead 3ᵈ with the lead 4. It will be seen that by moving the main barrel from position I through positions II, III, and IV to position V the amount of resistance in the shunt field-circuit is gradually decreased. Consequently as the resistance is decreased the current flowing through the shunt field-circuit, and therefore the field excitation, is increased until the main barrel is moved into position V, in which position the shunt field-circuit and excitation are at a maximum. While the main barrel is moved through the several positions described, two contacts 43 44, connected electrically together and carried by the main barrel, are moved onto contacts 41 42, respectively. These contacts 43 44 are of such length that they move over the contacts 41 42, respectively, until the main barrel is moving into position XIV. Also when the main barrel is moving from position III, two contacts 21 22, connected electrically together, are moved onto contacts R⁵ R⁴, respectively. The function of the contacts 43 44 21 22 will appear hereafter; but it may be here remarked that the contacts 31 32 form part of the floating ring or rings hereinbefore mentioned.

In moving the main barrel from position V to position VI the armatures, which up to the present have been short-circuited through a resistance, are placed in series with resistance in the power-circuit. This placing of the armatures in circuit is effected by a contact 17, carried by the main barrel and connected electrically to contact 1, being moved onto a contact 18. The contact 18 is connected by a lead 19 with the contact $R^5$. Contact $R^5$ is connected by a lead 20 with one terminal of a resistance $r^4$ of a bank of resistances $r^4$ $r^3$ $r^2$ $r'$. The terminal connecting the resistances $r^4$ $r^3$ is connected by a lead 23 to the contact $R^4$. The terminal connecting the resistances $r^3$ $r^2$ is connected by a lead 59 to the contact $R^3$. The terminal connecting the resistances $r^2$ $r'$ is connected by a lead 60 to the contact $R^2$, and the second terminal of the resistance $r'$ is connected to a lead 24; but, as has been stated, the contacts 21 22 are at this time on contacts $R^5$ $R^4$, and this being so the resistance $r^4$ is short-circuited. The armature-circuit in position VI is as follows: from the trolley-wire L to the contact T and from the contact T by the contacts 1, 17, and 18, lead 19, contacts $R^5$ 21 22 $R^4$, lead 23 to and through the resistances $r^3$ $r^2$ $r'$, leads 24 25, contacts 26 27, and 28, lead 29, contacts 30 31 32, leads 33 34, brush $AA^2$, armature No. 2, brush $AA'$, leads 35 36, contacts 37 38 39, lead 40, contacts 41 43 44 42, lead 45, contacts 46 47 48, leads 49 50, brush $A^2$, armature No. 1, brush $A'$, leads 51 52, contacts 53 54 55, lead 56 to the earthed lead $99^a$. The armature-circuit, which has been closed in the manner described, contains in position VI a considerable amount of resistance. To increase the speed of the motors, it is necessary to reduce the resistance in the armature-circuit, and this resistance is short-circuited in steps by moving the main barrel through positions VII, VIII, and IX.

In moving the main barrel from position VI to position VII the first step of resistance—i. e., resistance $r^2$—is short-circuited. This is accomplished by two contacts 57 and 58, connected electrically together and carried by the main barrel, being moved onto the contacts $R^3$ and $R^2$, respectively, and short-circuiting the resistance $r^2$. The armature-circuit as far as the contact $R^4$ is now as explained with reference to position VI. From the contact $R^4$ the circuit is by lead 23, resistance $r^3$, lead 59, contacts $R^3$ 57 58 $R^2$, lead 69, resistance $r'$, lead 24 to the earthed lead $99^a$, as hereinbefore explained. In moving the main barrel from position VII to position VIII the second step of resistance—resistance $r'$—is short-circuited. This is accomplished by a contact 61, connected electrically to contacts 58 57 and carried by the main barrel, being moved onto a contact 62. The contact 58 has when this position is reached been moved off contact $R^2$; but the new connection maintains the short circuit on resistance $r^2$ and also short-circuits resistance $r'$. The armature-circuit as far as contact $R^3$ is as before explained with reference to positions VI and VII, and from contact $R^3$ the circuit is by contacts 57 61 62, leads 63 29 contact 30 and to the earthed lead $99^a$, as hereinbefore explained. In moving the main barrel from position VIII to position IX the third and last step of resistance—i. e., resistance $r^3$—is short-circuited. This is accomplished by a contact $22^a$, that, together with a contact $21^a$, forms part of the floating ring hereinbefore mentioned, being moved onto a contact 64. The contacts $21^a$ $22^a$ are connected electrically together and to the contact 21. The connection described short-circuits the resistance $r^3$. The contact 64 is connected by a lead 65 to the contact $R^3$. The armature-circuit for this ninth position of the main barrel is as follows: from the trolley-wire L to the contact $R^5$, as hereinbefore described with reference to positions VI, VII, and VIII. From the contact $R^5$ the circuit is by contacts 21 $21^a$ $22^a$ 64, lead 65, contacts $R^3$ 57 61 62, and then as hereinbefore explained with reference to position VIII. It will be seen that so far resistance $r^4$ has not been placed in circuit with the armatures when the power-circuit is closed. When position IX is reached, all the resistance has been taken out of the armature-circuit. An increase of speed can be brought about by reducing the strength of the shunt-fields, which have been maintained fully excited from position V to position IX by reason of the fact that contact 16 has been during the movements described in contact with the contact $SR^5$. The reduction of the strength of the shunt-field is brought about by the insertion of the resistance $sr'$ $sr^2$ $sr^3$ $sr^4$ into the shunt field-circuit. This resistance is introduced in steps and in position X, XI, XII, and XIII of the main barrel. In moving the main barrel to position X the resistance $sr^4$ is again inserted in circuit. This is accomplished by the contact 16 being moved off the contact $SR^5$ and a contact $15^a$, connected electrically to contact 1 and carried by the main barrel, being moved onto the contact $SR^4$. The shunt-field circuit is then as described with reference to position IV. In moving the main barrel to position XI a contact $14^a$ is moved onto the contact $SR^3$. Resistances $sr^4$ $sr^3$ are thus placed in circuit. In moving the main barrel to position XII a contact $13^a$ is moved onto the contact $SR^2$. Resistances $sr^4$ $sr^3$ $sr^2$ are thus placed in circuit, and in moving the main barrel to position XIII a contact $2^a$ is moved onto the contact $SR'$. Resistances $sr^4$ $sr^3$ $sr^2$ $sr'$ are thus placed in circuit. Contacts $14^a$ $13^a$ $2^a$ are connected electrically to contact 1 and are carried by the main barrel. In moving the main barrel to position XIV no change in the connections is made. In positions XIII and XIV the motors are running at their maximum speed as shunt-machines. In moving the main barrel to position XV the first set of operations necessary for placing the armatures in series with their series field-windings and in parallel with one another is entered upon. Up to the present the motors have been simple shunt-machines; but when placed in parallel they are converted into compound-wound machines. When the main barrel is moved into position XV, the shunt-field is restored to full strength and the armature-circuit is broken. This is done by the contact $2^a$ moving off the contact SR' and a contact 66, electrically connected to contact 1 and carried by the main barrel, moving onto the contact $SR^5$ at the same time the contacts 17 61 57 43 44 21 22 $22^a$ move off the contacts 18 62 $R^3$ 41 42 $R^5$ $R^4$ 64, respectively. In moving to position XVI the armature-circuit is again closed, the armatures being placed in parallel with one another and in series with their series field-windings, resistance being at the same time placed in circuit. This series of operations is effected by contacts 67, 68, 69, 70, 71, 72, 73, $21^a$, and $22^a$ moving onto contacts 18, 62, $R^3$, 74, 41, 76, 77, $R^5$, and $R^4$. The contact 67 is connected electrically to contact 1, and contacts 68 and 69, 70 and 71, 72 and 73, and 42 and 76 connected together. The armature-circuits for this parallel connection are now as follows: from the trolley-wire L to contact 1 and from contact 1, by contacts 67 18, lead 19, contacts $R^5$ $21^a$ $22^a$ $R^4$, lead 23, resistance $r^3$, lead 59, contacts $R^3$ 69 68 62, leads 63 29, to contact 30. At contact 30 two paths are open for the current. The one path is through armature No. 1, and the other path is through armature No. 2, The path through armature No. 2 is as follows: from contact 30, by contacts 31 32, leads 33 34, brush $AA^2$, armature No. 2, brush AA', leads 35 36, contacts 37 38 39, lead 40, contacts 41 71 70 74, lead 75, contacts 78 79 80, leads 81 82, to the terminal of the series field-windings $FF^2$ FF'. At this terminal two paths are open for the current. The one path is through resistance $r^9$ $r^8$ in parallel with the series field-windings $FF^2$ FF', lead 83, contacts 84 86 85 to earth, and the other path is through the series field-windings to earth. The contact 86, as is also a contact 88, hereafter referred to, is carried by the main barrel or an extension thereof, and these contacts 86 88 are so arranged as to span the contacts 84 and 85 and 87 and 89, respectively, during the time the motors are in parallel. The path through armature No. 1 is as follows: from lead 29, by the contacts 28 27 26, leads 25 24, to the terminal of the series field-winding $F^2$ F'. At this terminal two paths are open for the current. The one path is through resistance $r^7$ $r^6$ in parallel with the series field-windings $F^2$ F', lead 86, contacts 87 88 89 to lead 92, and the other path is through the series field-windings $F^2$ F', by leads 93 94, contacts 95 96 97 to lead 92, where the current unites with that which has passed through the resistances $r^7$ $r^6$. From lead 92 the circuit is by contacts 77 73 72 76 42, lead 45, contacts 46 47 48, leads 49 50, brush $A^2$, armature No. 1, brush A', leads 51 52, contacts 53 54 55, and lead 56 to earth. From what has been said it will be seen that one terminal of resistance r' and one terminal of resistances $r^7$ $r^6$ and series field-windings $F^2$ F' are all connected to one and the same lead 24 and that this lead 24 as also lead 25 and contacts 26 27 28 serve for two different circuits.

The motors having now been placed in parallel, the next step is to reduce the resistance in the armature-circuit. This is done in moving the main barrel to position XVII. In moving to this position the contact 22 is moved onto contact 64. The resistance $r^3$ is thus short-circuited. The armatures in this position are in series with their series field-windings and in parallel with one another, no resistance being in circuit. To increase further the speed of the motors, resistance is inserted in the shunt field-circuit, the armatures being maintained in series with their series field-windings and in parallel with one another. The insertion of the shunt field resistance is done in two steps. In moving the main barrel to position XVIII a contact 98, connected electrically to the contact 1 and carried by the main barrel, is moved onto the contact $SR^4$, thus inserting resistance $sr^4$. In moving the main barrel to position XIX a contact 99, connected electrically to the contact 1 and carried by the main barrel, is moved onto the contact $SR^3$, thus inserting resistance $sr^3$.

In position XIX the main barrel is at the end of its movement. To retard the tramcar, it is necessary to move the main barrel in a reverse direction. In moving the main barrel from position RI to position RII resistance is taken out of the shunt field-circuit. This is done by the contact 99 moving off the contact $SR^3$ and the contact 98 onto the contact $SR^4$. In moving the main barrel to position RIII further resistance is taken out of the shunt field-circuit. This is done by the contact 98 moving off the contact $SR^4$ and the contact 66 onto the contact $SR^5$. The shunt-fields are now fully excited and are so maintained when the main barrel is moved into position RIV. In moving the main barrel to this position no change in the connections is made; but in moving it to position RV the parallel connections are broken. This is done by the contacts 67 68 69 70 71 72 73 moving off the contacts 18 62 $R^3$ 74 41 76 77, respectively. At the same time the strength of the shunt-fields is reduced by the contact 66 moving off the contact $SR^5$ and the contact $2^a$ onto the contact SR', thus placing all the resistances $sr'$ $sr^2$ $sr^3$ $sr^4$ in circuit. In moving the main barrel to position RVI the series connections are remade—i. e., the armatures are placed in series and with resistance in the power-circuit. This is effected by the contacts 17 61 57 43 44 moving onto contacts 18 62 $R^3$ 41 42, and at the same time the resistance is inserted in circuit by the contacts $21^a$ $22^a$ 22 moving off the contacts $R^5$ $R^4$ 64. This resistance comprises the resistances $r^4$ $r^3$. It will be seen that the resistance placed in circuit when the motors are placed in series is greater than the resistance placed in circuit when the motors are placed in parallel. In moving the main barrel to position RVII the resistances $r^4$ $r^3$ are short-circuited. This is due to the fact that the contacts 21, 22, and $22^a$ are moved onto the contacts $R^5$, $R^4$, and 64, respectively. In moving the main barrel through positions RVIII, RIX, RX, and RXI the excitation of the shunt-fields is increased at each position as resistance is short-circuited by contacts $13^a$, $14^a$, $15^a$, and 16 being moved onto contacts $SR^2$, $SR^3$, $SR^4$, and $SR^5$, respectively. In positions RVII, RVIII, RIX, RX, and RXI there is no resistance in the armature-circuit. In moving the main barrel through positions RXII, RXIII, and RXIV resistance is inserted in the armature-circuit—i. e., in moving through position RXII the contact $22^a$ moves off the contact 64, and so places resistance $r^3$ in circuit. In moving to position RXIII the contact 61 moves off the contact 62 and the contact 58 moves onto the contact $R^2$, and so places resistances $r^3$ $r'$ in circuit, and in moving to position RXIV the contacts 58 57 move off the contacts $R^2$ $R^3$, and so place the resistances $r^3$ $r^2$ $r'$ in circuit. In moving the main barrel from position RXIV to position RXV the armature-circuit is broken as contact 17 is moved off the contact 18. During this movement the armatures are short-circuited through resistances $r'$ $r^2$. This connection is effected by two contacts 100 101, connected electrically together and carried by the main barrel. These contacts 100 101 are in position RXIV moved onto a contact E, connected to the earthed lead $99^a$, and to the contact $R^3$. The circuit for this connection, starting from brush $AA'$, is as follows: brush $AA'$, leads 35 36, contacts 37 38 39, lead 40, contacts 41 43 44 42, lead 45, contacts 46 47 48, leads 49 50, brush $A^2$, armature No. 1, brush $A'$, leads 51 52, contacts 53 54 55, lead 56, contacts E 100 101 $R^3$, lead 59, resistances $r^2$ $r'$, leads 24 25, contacts 26 27 28, lead 29, contacts 30 31 32, leads 33 34, brush $AA^2$, armature No. 2. In moving the main barrel to and through positions RXVI RXVII RXVIII RXIX resistance is gradually inserted in the shunt field-circuit by contacts 16 15 14 13 moving over the contacts $SR^5$ $SR^4$ $Sr^3$ $SR^2$, respectively. In position RXIX the contact 2 is on contact $SR'$ and all resistance $sr'$ $sr^2$ $sr^3$ $sr^4$ is in circuit.

In the final off position all connection of the motors with the trolley-wire L is broken as contacts 1 101 100 43 44 move off contacts T $R^3$ E 41 42. Contacts 21 22 have already moved off contacts $R^5$ $R^4$; but their movement has had no effect upon the armature short circuit. As it is desired to have an emergency or braking effect when the main barrel is in the off position, the contacts 68 69 70 71 72 73 are made of such a length that they come again into contact with the contacts 62 $R^3$ 74 41 76 77 when the main barrel is in the final off position; but to move the main barrel into the final off position will not give the emergency or braking effect. To obtain the emergency or braking effect, it is necessary to reverse the relationship of the armatures to the fields. This is done by moving the reversing-barrel so that a second set of contacts $54^b$ $54^b$ $47^a$ $47^b$ $38^a$ $38^b$ $31^a$ $31^b$ $27^a$ $96^a$ $79^a$ $10^a$ come into contact with contacts 55 53 48 46 39 37 32 30, 28 and 26, 97 and 95, 78 and 80, and 9 and 11, respectively. The circuit is now as follows: from series field-windings $FF'$ $FF^2$ by leads 82 81, contacts 80 $79^a$ 78, lead 75, contacts 74 70 71 41, lead 40, contacts 39 $38^a$ $31^a$ 32, leads 33 34, brush $AA^2$, armature No. 2, brush $AA'$, leads 35 36, contacts 37 $38^b$ $31^b$ 30, lead 29, contacts 28 $27^a$ 26, leads 25 24, series field-windings $F^2$ $F'$, leads 93 94, contacts 95 $96^a$ 97, lead 92, contacts 77 73 72 76, lead 45, contacts 46 $47^b$ $54^b$ 53, leads 52 51, brush $A'$, armature No. 1, brush $A^2$, leads 50 49, contacts 48 $47^a$ $54^a$ 55, and leads 56 $99^a$ to series field-windings $FF'$ $FF^2$.

It will be understood that when the motors are converted into series motors in the manner described a resistance might be placed in circuit and the main barrel so arranged as to have a movement beyond the off position, such further movement causing contacts on the main barrel to cut the inserted resistance out of circuit.

Having thus described the various connections and circuits that are made in operating the controller-handle from the off position to position XIX and from position RI to the off position, a description will now be given of that part of the controller hereinbefore referred to as the "floating ring or rings." The construction adopted is shown in Figs. 2 and 3 and 4, Fig. 2 being a plan, Fig. 3 a cross-section on the line A B of Fig. 2, and Fig. 4 a plan of the operating-arm.

102 is the vertical arbor of the main barrel of the controller. On this arbor 102 is securely fixed a sleeve 103 of insulating material, to which in turn is secured a carrier 104, that is formed at one end—i. e., its lower end when in position on the sleeve 103—with a flange 105 and a laterally-extending operating-arm 106. Loosely mounted on the carrier 104, so as to rest on the flange 105, is a contact-carrier 107. This contact-carrier 107 is formed with two laterally-projecting arms 108 109, that at the ends have upwardly and downwardly extending flanges 110 111, to which the contacts 21 22 21ª 22ª are secured in manner shown. The contact-carrier 107 is, as stated, loosely mounted on the carrier 104, but is connected thereto in such manner that when the arbor 102 is rotated in one direction or the other the contact-carrier 107 will remain stationary for a portion of the movement of the arbor and will then be connected to and moved by the carrier 104. This loose connection is effected as follows: The laterally-projecting arm 108 has a radial slot 112 formed therein, and the laterally-projecting operating-arm 106 carries an upwardly-projecting pin 113, that is so placed and is of such a size as to enter and move in the slot 112. In operation, therefore, when the direction of rotation of the arbor is reversed it will be turned through a certain angle, depending on the length of the slot 112, before the pin comes in contact with the end of the slot, and so drives the contact-carrier. The contacts are so carried by their carrier that in operating the controller in a forward direction the contacts 21 22 do not come onto the contacts R⁵ R⁴ until the main barrel is moving from position III. When the main barrel is moved from position XIX or rather from position R'—i. e., in a backward direction—the carrier remains stationary and does not move with the main barrel until the pin comes to the end of the slot 112, which it does when the main barrel is in position RII. By this means the sequence of events in the forward and backward cycles of operations is altered.

What I claim is—

1. The combination with a controller for the series-parallel control of electric motors of the kind herein referred to, of means for inserting resistance in the armature-circuit of the motor when the motor connections are being changed from series to parallel and the motor-fields are at a maximum.

2. The combination with a controller for the series-parallel control of electric motors of the kind herein referred to and in which resistance is inserted in the armature-circuit in the interval which occurs while the motor connections are being changed from series to parallel and vice versa, of means for inserting a greater amount of resistance in the circuit when going into series than when going into parallel.

3. The combination with a controller for the series-parallel control of electric motors of the kind herein referred to whereby cycles of operations necessary to place the motors in parallel as compound machines after being in series as shunt-machines or in series as shunt-machines after being in parallel as compound machines are carried out, of means for altering the sequence of the changes in the cycle used in placing the motors in series after being in parallel from that which would be a simple reversal of the sequence used in placing the motors in parallel.

4. A controller for the series-parallel control of electric motors of the kind herein referred to, comprising a set of moving contacts and a set of stationary contacts connected to various circuits, said moving contacts being so arranged as when moved relatively to the stationary contacts to alter the various circuits, and when moved in one direction so arranged as first to close the shunt-field circuit and bring the fields to their maximum excitation, then to close the armature-circuit through resistance with the armatures in series, to withdraw the resistance gradually, to reduce the field excitation and then to break the armature-circuit and remake the same but with the armatures in parallel and in series with the series field-windings of the motors.

5. A controller for the series-parallel control of electric motors of the kind herein referred to, comprising a set of moving contacts and a set of stationary contacts connected to various circuits, said moving contacts being so adapted as when moved relatively to the stationary contacts to alter the various circuits, and so arranged as, when moved in one direction, first to close the shunt field-circuit and bring the fields to their maximum excitation, then to close the armature-circuit through resistance with the armatures in series, to withdraw the resistance gradually and to reduce the field excitation, and then to break the armature-circuit, to insert resistance in the armature-circuit and to remake the armature-circuit but with the armatures in parallel and in series with the series field-windings of the motors.

6. A controller for the series-parallel control of electric motors of the kind herein referred to, comprising a set of moving contacts and a set of stationary contacts connected to various circuits, said moving contacts being so adapted as when moved relatively to the stationary contacts to alter the various circuits, and so arranged as, when moved in one direction, to first close the shunt field-circuit and bring the fields to their maximum excitation, then to close the armature-circuit through resistance with the armatures in series, to withdraw the resistance gradually and to reduce the field excitation, and then to break the armature-circuit, to increase the strength of the shunt-fields and remake the armature-circuit but with the armatures in parallel and in series with the series field-windings of the motors.

7. A controller for the series-parallel control of electric motors of the kind herein referred to, comprising a set of moving contacts and a set of stationary contacts connected to various circuits, said moving contacts being so adapted as, when moved relatively to the stationary contacts, to alter the various circuits and so arranged as, when moved in one direction, first to close the shunt field-circuit and bring the fields up to their maximum excitation, then to close the armature-circuit through resistance with the armatures in series, to withdraw resistance gradually and to reduce the field excitation and then to break the armature-circuit, to increase the strength of the shunt-fields, insert resistance in the armature-circuit and remake the same but with the armatures in parallel and in series with the series field-windings of the motors.

8. A controller for the series-parallel control of electric motors of the kind herein referred to, comprising a set of moving contacts and a set of stationary contacts connected to various circuits, said moving contacts being so adapted as, when moved relatively to the stationary contacts, to alter the various circuits, and so arranged as, when moved in one direction, first to close the shunt field-circuit and bring the fields to their maximum excitation, then to close the armature-circuit through resistance with the armatures in series, to withdraw the resistance gradually and to reduce the field excitation, and then to break the armature-circuit, to increase the strength of the shunt-fields, insert resistance in the armature-circuit, remake the same but with the armatures in parallel and in series with the series field-windings of the motors and then to cut out said resistance.

9. A controller for the series-parallel control of electric motors of the kind herein referred to, comprising a set of moving contacts and a set of stationary contacts connected to various circuits, said moving contacts being so adapted as, when moved relatively to the stationary contacts, to alter the said circuits, and so arranged as, when moved in one direction, first to close the shunt field-circuit and bring the fields to their maximum excitation, then to close the armature-circuit through resistance with the armatures in series, to withdraw the resistance gradually, and to reduce the field excitation and then to break the armature-circuit, to increase the strength of the shunt-fields, insert a resistance in the armature-circuit, remake the same but with the armatures in parallel and in series with the series field-windings of the motors, then to cut out said resistance and then to reduce the strength of the shunt-fields.

10. A controller for the series-parallel control of electric motors of the kind herein referred to, comprising a set of movable contacts and a set of stationary contacts connected to various circuits, said moving contacts being so adapted as, when moved relatively to the stationary contacts, to alter the said circuits, and so arranged as, when moved in one direction, first to close the shunt field-circuit and bring the fields to their maximum excitation, then to close the armature-circuit through resistance with the armatures in series, to withdraw the resistance gradually and to reduce the field excitation, then to place the armatures in parallel and in series with the series field-windings of the motors and, when moved again to break the armature-circuit and remake the same but with the armatures in series.

11. A controller for the series-parallel control of electric motors of the kind herein referred to, comprising a set of moving contacts and a set of stationary contacts connected to various circuits, said moving contacts being so adapted as, when moved relatively to the stationary contacts to alter the various circuits and, when moved in one direction, so arranged as first to close the shunt field-circuit and bring the fields to their maximum excitation, then to close the armature-circuit through resistance with the armatures in series, to withdraw the resistance gradually and to reduce the field excitation, then to place the armatures in parallel and in series with the series field-windings of the motors and, when moved reversely to break the armature-circuit, reduce the strength of the shunt-fields and remake the armature-circuit but with the armatures in series.

12. A controller for the series-parallel control of electric motors of the kind herein referred to, comprising a set of moving contacts and a set of stationary contacts connected to various circuits, said moving contacts being so adapted as, when moved relatively to the stationary contacts, to alter the various circuits, and when moved in one direction so arranged as first to close the shunt field-circuit and bring the fields to their maximum excitation, then to close the armature-circuit through resistance with the armatures in series, to withdraw the resistance gradually and to reduce the field excitation, then to place the armatures in parallel and in series with the series field-windings of the motors and, when moved reversely to break the armature-circuit, insert resistance in the armature-circuit, and remake the same but with the armatures in series.

13. A controller for the series-parallel control of electric motors of the kind herein referred to, comprising a set of moving contacts and a set of stationary contacts connected to various circuits, said moving contacts being so adapted as, when moved relatively to the stationary contacts to alter the various circuits, and so arranged as, when moved in one direction, to first close the shunt field-circuit and bring the fields to their maximum excitation, then to close the armature-circuit through resistance with the armatures in series, to withdraw the resistance gradually and to reduce the field excitation, then to place the armatures in parallel and in series with the series field-windings of the motors and, when moved reversely to break the armature-circuit, reduce the strength of the shunt-fields, insert resistance in the armature-circuit and remake the same but with the armatures in series.

14. A controller for the series-parallel control of electric motors of the kind herein referred to, comprising a set of moving contacts and a set of stationary contacts connected to various circuits, said moving contacts being so adapted as, when moved relatively to the stationary contacts, to alter the various circuits and so arranged as, when moved in one direction, first to close the shunt field-circuit and bring the fields to their maximum excitation, then to close the armature-circuit through resistance with the armatures in series, to withdraw the resistance gradually and to reduce the field excitation, then to place the armatures in parallel and in series with the series field-windings of the motors and, when moved again to break the armature-circuit, to reduce the strength of the shunt-fields, to insert resistance in the armature-circuit, to remake the same but with the armatures in series and then to cut out said resistance.

15. A controller for the series-parallel control of electric motors of the kind herein referred to, comprising a set of moving contacts and a set of stationary contacts connected to various circuits, said moving contacts being so adapted as, when moved relatively to the stationary contacts, to alter the various circuits and so arranged as, when moved in one direction, first to close the shunt field-circuit and bring the fields to their maximum excitation, then to close the armature-circuit through resistance with the armatures in series, to withdraw the resistance gradually and to reduce the field excitation, then to place the armatures in parallel and in series with the series field-windings of the motors and to reduce the strength of the shunt-fields and when moved reversely to increase the strength of the shunt-fields, break the armature-circuit and remake the same but with the armatures in series.

16. A controller for the series-parallel control of electric motors of the kind herein referred to, comprising a set of moving contacts and a set of stationary contacts connected to various circuits, said moving contacts being so adapted as, when moved in relatively to the stationary contacts, to alter the various circuits and so arranged as, when moved in one direction, first to close the shunt field-circuit and bring the fields to their maximum excitation, then to close the armature-circuit through resistance with the armatures in series, to withdraw the resistance gradually and to reduce the field excitation, then to place the armatures in parallel and in series with the series field-windings of the motors and to reduce the strength of the shunt-fields and when moved reversely to increase the strength of the shunt-fields, to break the armature-circuit, to insert resistance in the armature-circuit and to remake said circuit but with the armatures in series.

17. A controller for the series-parallel control of electric motors of the kind herein referred to, comprising a set of moving contacts and a set of stationary contacts connected to various circuits, said moving contacts being so adapted as, when moved relatively to the stationary contacts, to alter the various circuits and so arranged as, when moved in one direction, first to close the shunt field-circuit and bring the fields to their maximum excitation, then to close the armature-circuit through resistance with the armatures in series, to withdraw the resistance gradually, and to reduce the field excitation, then to place the armatures in parallel and in series with the series field-windings of the motors, and to reduce the strength of the shunt-fields and when moved reversely to increase the strength of the shunt-fields, break the armature-circuits, reduce the strength of the shunt-fields, insert resistance in the armature-circuit and remake the armature-circuit but with the armatures in series.

18. A controller for the series-parallel control of electric motors of the kind herein referred to, comprising a set of moving contacts and a set of stationary contacts connected to various circuits, said moving contacts being so adapted as, when moved relatively to the stationary contacts, to alter the various circuits, and so arranged as, when moved in one direction, first to close the shunt field-circuit and bring the fields to their maximum excitation, then to close the armature-circuit through resistance with the armatures in series, to withdraw the resistance gradually, and to reduce the field excitation, then to place the armatures in parallel and in series with the series field-windings of the motors and to reduce the strength of the shunt-fields and when moved reversely to increase the strength of the shunt-fields, break the armature-circuits, reduce the strength of the shunt-fields and remake the armature-circuit but with the armatures in series.

19. A controller for the series-parallel control of electric motors of the kind herein referred to, comprising a set of moving contacts and a set of stationary contacts connected to various circuits, said moving contacts being so adapted as, when moved relatively to the stationary contacts, to alter the various circuits and so arranged as, when moved in one direction, first to close the shunt field-circuit and bring the fields to their maximum excitation, then to close the armature-circuit through resistance with the armatures in series, to withdraw the resistance gradually and to reduce the field excitation, then to place the armatures in parallel and in series with the series field-windings of the motors and to reduce the strength of the shunt-fields and when moved reversely to increase the strength of the shunt-fields, break the armature-circuits, reduce the strength of the shunt-fields, insert resistance in the armature-circuit, remake the same but with the armatures in series and then to cut out said resistance.

20. A controller for the series-parallel control of electric motors of the kind herein referred to, comprising a set of moving contacts and a set of stationary contacts connected to various circuits, said moving contacts being so adapted as, when moved relatively to the stationary contacts, to alter the various circuits and so arranged as, when moved in one direction, first to close the shunt field-circuit and bring the fields to their maximum excitation, then to close the armature-circuit through resistance with the armatures in series, to withdraw the resistance gradually, and to reduce the field excitation, then to place the armatures in parallel and in series with the series field-windings of the motors and, when moved reversely to break the armature-circuit, reduce the strength of the shunt-fields, insert resistance in the armature-circuit, remake the same but with the armatures in series, then to cut out said resistance and increase the shunt-field excitation.

21. A controller for the series parallel control of electric motors of the kind herein referred to, comprising a set of moving contacts and a set of stationary contacts connected to various circuits, said moving contacts being so adapted as when moved relatively to the stationary contacts, to alter the various circuits and so arranged as, when moved in one direction, first to close the shunt field-circuit and bring the fields to their maximum excitation, then to close the armature-circuit through resistance with the armatures in series, to withdraw the resistance gradually, and to reduce the field excitation, then to place the armatures in parallel and in series with the series field-windings of the motors and to reduce the strength of the shunt-fields and when moved reversely to increase the strength of the shunt-fields, break the armature-circuit, reduce the strength of the shunt-fields, insert resistance in the armature-circuit, remake the same but with the armatures in series, then to cut out said resistance and increase the shunt-field excitation.

22. A controller for the series-parallel control of electric motors of the kind herein referred to, comprising a set of moving contacts and a set of stationary contacts connected to various circuits, said moving contacts being so adapted as, when moved relatively to the stationary contacts, to alter the various circuits and so arranged as, when moved in one direction, first to close the shunt field-circuit and bring the fields to their maximum excitation, then to close the armature-circuit through resistance with the armatures in series, to withdraw the resistance gradually and to reduce the field excitation, then to place the armatures in parallel and in series with the series field-windings of the motors and to reduce the strength of the shunt-fields and when moved reversely to increase the strength of the shunt-fields, break the armature-circuits, reduce the strength of the shunt-fields, insert resistance in the armature-circuit, remake the same but with the armatures in series, then to cut out said resistance, increase the shunt-field excitation and when this is at a maximum gradually insert resistance in the armature-circuit.

23. A controller for the series-parallel control of electric motors of the kind herein referred to, comprising a set of moving contacts and a set of stationary contacts connected to various circuits, said moving contacts being so adapted as, when moved relatively to the stationary contacts, to alter the various circuits and so arranged as, when moved in one direction, first to close the shunt field-circuit and bring the fields to their maximum excitation, then to close the armature-circuit through resistance with the armatures in series, to withdraw the resistance gradually and to reduce the field excitation, then to place the armatures in parallel and in series with the series field-windings of the motors and when moved again to break the armature-circuit, reduce the strength of the shunt-fields, insert resistance in the armature-circuit, remake the same but with the armatures in series, then to cut out said resistance, increase the shunt-field excitation and when this is at a maximum gradually insert resistance in the armature-circuit.

24. A controller for the series-parallel control of electric motors of the kind herein referred to, comprising a set of moving contacts and a set of stationary contacts connected to various circuits, said moving contacts being so adapted as, when moved relatively to the stationary contacts, to alter the various circuits and so arranged as, when moved in one direction, first to close the shunt field-circuit and bring the fields to their maximum excitation, then to close the armature-circuit through resistance with the armatures in series, to withdraw the resistance gradually and to reduce the field excitation, and then to break the armature-circuit, to increase the strength of the shunt-fields, insert a resistance in the armature-circuit and to connect up the armatures in parallel and in series with the series field-windings and then to cut out said resistance and when moved reversely to break the armature-circuits, insert resistance in the armature-circuit and remake the same but with the armatures in series, the amount of resistance inserted in circuit when going into series being greater than that inserted in circuit when going into parallel.

25. A controller for the series-parallel control of electric motors of the kind herein referred to, comprising a set of moving contacts and a set of stationary contacts connected to various circuits, said moving contacts being so adapted as, when moved relatively to the stationary contacts, to alter the various circuits and so arranged as, when moved in one direction, first to close the shunt field-circuit and bring the fields to their maximum excitation, then to close the armature-circuit through resistance with the armatures in series, to withdraw the resistance gradually and to reduce the field excitation, then to break the armature-circuit, to increase the strength of the shunt-fields, insert a resistance in the armature-circuit and to connect up the armatures in parallel and in series with the series field-windings and then to cut out said resistance and when moved reversely to break the armature-circuits, reduce the strength of the shunt-fields, insert resistance in the armature-circuit and remake the armature-circuit but with the armatures in series, the amount of resistance inserted in the armature-circuit when going into series being greater than that inserted in circuit when going into parallel.

26. A controller for the series-parallel control of electric motors of the kind herein referred to, comprising a set of moving contacts and a set of stationary contacts connected to various circuits, said moving contacts being so adapted as, when moved relatively to the stationary contacts, to alter the various circuits and so arranged as, when moved in one direction, first to close the shunt field-circuit and bring the fields to their maximum excitation, then to close the armature-circuit through resistance with the armatures in series, to withdraw the resistance gradually, and to reduce the field excitation, then to break the armature-circuit, to increase the strength of the shunt-fields, insert a resistance in the armature-circuit and to connect up the armatures in parallel and in series with the series field-windings and then to cut out said resistance and when moved reversely to break the armature-circuits, reduce the strength of the shunt-fields, insert resistance in the armature-circuit, remake the same but with the armatures in series and then to cut out said resistance, the amount of resistance inserted in the armature-circuit when going into series being greater than that inserted in circuit when going into parallel.

27. A controller for the series-parallel control of electric motors of the kind herein referred to, comprising a set of moving contacts and a set of stationary contacts connected to various circuits, said moving contacts being so adapted as, when moved relatively to the stationary contacts, to alter the various circuits and so arranged as, when moved in one direction, first to close the shunt field-circuit and bring the fields to their maximum excitation, then to close the armature-circuit through resistance with the armatures in series, to withdraw the resistance gradually and to reduce the field excitation, then to break the armature-circuit, to increase the strength of the shunt-fields, insert resistance in the armature-circuit and to connect up the armatures in parallel and in series with the series field-windings, then to cut out said resistance and reduce the shunt-field excitation, and when moved reversely to increase the strength of the shunt-fields, break the armature-circuits, reduce the strength of the shunt-fields, insert resistance in the armature-circuit, remake the latter but with the armatures in series and then to cut out said resistance, the amount of resistance inserted in the armature-circuit when going into series being greater than that inserted in circuit when going into parallel.

28. A controller for the series-parallel control of electric motors of the kind herein referred to, comprising a set of moving contacts and a set of stationary contacts connected to various circuits, said moving contacts being so adapted as, when moved relatively to the stationary contacts, to alter the various circuits and being so arranged as, when moved in one direction, first to close the shunt field-circuit and bring the fields to their maximum excitation, then to close the armature-circuit through resistance with the armatures in series, to withdraw the resistance gradually and to reduce the field excitation, then to break the armature-circuit, to increase the strength of the shunt-fields, insert resistance in the armature-circuit and to connect up the armatures in parallel and in series with the series field-windings, then to cut out said resistance and reduce the shunt-field excitation and when moved reversely to increase the strength of the shunt-fields, break the armature-circuits, insert resistance in the armature-circuit and remake the armature-circuit but with the armatures in series, the amount of resistance inserted in circuit when going into series being greater than that inserted in circuit when going into parallel.

29. A controller for the series-parallel control of electric motors of the kind herein referred to, comprising a set of moving contacts and a set of stationary contacts connected to various circuits, said moving contacts being so adapted as, when moved relatively to the stationary contacts, to alter the various circuits and so arranged as, when moved in one direction, first to close the shunt field-circuit and bring the fields to their maximum excitation, then to close the armature-circuit through resistance with the armatures in series, to withdraw the resistance gradually and to reduce the field excitation, then to break the armature-circuit, to increase the strength of the shunt-fields, insert resistance in the armature-circuit and to connect up the armatures in parallel and in series with the series field-windings, then to cut out said resistance and reduce the shunt-field excitation and when moved reversely to increase the strength of the shunt-fields, break the armature-circuits, reduce the strength of the shunt-fields, insert resistance in the armature-circuit, remake the latter but with the armatures in series, then to cut out said resistance and increase the shunt-field excitation, the amount of resistance inserted in circuit when going into series being greater than that inserted in circuit when going into parallel.

30. A controller for the series-parallel control of electric motors of the kind herein referred to, comprising a set of moving contacts and a set of stationary contacts connected to various circuits, said moving contacts being so adapted as, when moved relatively to the stationary contacts, to alter the various circuits and so arranged as, when moved in one direction, first to close the shunt field-circuit and bring the fields to their maximum excitation, then to close the armature-circuit through resistance with the armatures in series, to withdraw the resistance gradually and to reduce the field excitation, then to break the armature-circuit, to increase the strength of the shunt-fields, insert resistance in the armature-circuit and to connect up the armatures in parallel and in series with the series field-windings, then to cut out said resistance and reduce the shunt-field excitation, and when moved reversely to increase the strength of the shunt-fields, break the armature-circuits, reduce the strength of the shunt-fields, insert resistance in the armature-circuit, remake the latter but with the armatures in series, then to cut out said resistance, increase the shunt-field excitation and when this is at a maximum gradually insert resistance in the armature-circuit, the amount of resistance inserted in the armature-circuit when going into parallel being less than that inserted into the armature-circuit when going into series.

31. A controller for the series-parallel control of electric motors of the kind herein referred to, comprising a set of moving contacts and a set of stationary contacts connected to various circuits, said moving contacts being so adapted as, when moved relatively to the stationary contacts, to alter the various circuits and so arranged as, when moved in one direction, first to close the shunt field-circuit and bring the fields to their maximum excitation, then to close the armature-circuit through resistance with the armatures in series, to withdraw the resistance gradually and to reduce the field excitation, and then to place the armatures in parallel and in series with the series field-windings and at this change of connections to close the circuit for preventing a rush of current through the armature-coils by a change in the condition of the armature-circuit.

32. A controller for the series-parallel control of electric motors of the kind herein referred to, comprising a set of moving contacts and a set of stationary contacts connected to various circuits, said moving contacts being so adapted as, when moved relatively to the stationary contacts, to alter the various circuits and so arranged as, when moved in one direction, first to close the shunt field-circuit and bring the fields to their maximum excitation, then to close the armature-circuit through resistance with the armatures in series, to withdraw the resistance gradually and to reduce the field excitation, then to place the armatures in parallel and in series with the series field-windings of the motors and at this change of connections to close the circuit for preventing a rush of current through the armature-coils by a change in the condition of the armature-circuit and when the parallel connections are made removing the means by which such change in the condition of the armature-circuit is brought about.

33. A controller for the series-parallel control of electric motors of the kind herein referred to, comprising a set of moving contacts and a set of stationary contacts connected to various circuits, said moving contacts being so adapted as, when moved relatively to the fixed contacts, to alter the various circuits and so arranged as, when moved in one direction, first to close the shunt field-circuit and bring the fields to their maximum excitation, then to close the armature-circuit through resistance with the armatures in series, to withdraw said resistance gradually and to reduce the shunt-field excitation, then to place the armatures in parallel and in series with the series field-windings and at this change of connections to close the circuit for preventing a rush of current through the motor coils and windings by a change in the condition of the shunt field-circuit.

34. A controller for the series-parallel control of electric motors of the kind herein referred to, comprising a set of moving contacts and a set of stationary contacts connected to various circuits, said moving contacts being so adapted as, when moved relatively to the stationary contacts, to alter the various circuits and so arranged as, when moved in one direction, first to close the shunt field-circuit and bring the fields to their maximum excitation, then to close the armature-circuit through resistance with the armatures in series, to withdraw the resistance gradually and to reduce the shunt-field excitation, then to place the armatures in parallel and in series with the series field-windings and at this change of connections to close the armature-circuit through a resistance thus preventing rush of current through the armature-coils.

35. A controller for the series-parallel control of electric motors of the kind herein referred to, comprising a set of moving contacts and a set of stationary contacts connected to various circuits, said moving contacts being so adapted as, when moved relatively to the stationary contacts, to alter the various circuits and so arranged as, when moved in one direction, to close first the shunt field-circuit and bring the fields to their maximum excitation, then to close the armature-circuit through resistance with the armatures in series, to withdraw the said resistance gradually and to reduce the shunt-field excitation, then to place the armatures in parallel and in series with the series field-windings of the motors and at this change of connections to insert resistance in the armature-circuit and when the parallel connections are made removing this resistance from the armature-circuit.

36. A controller for the series-parallel control of electric motors of the kind herein referred to, comprising a set of moving contacts and a set of stationary contacts connected to various circuits, said moving contacts being so adapted as, when moved relatively to the stationary contacts, to alter the various circuits and so arranged as, when moved in one direction, first to close the shunt field-circuit and bring the fields to their maximum excitation, then to close the armature-circuit through resistance with the armatures in series, to withdraw the resistance gradually and to reduce the shunt-field excitation, then to place the armatures in parallel and in series with the series field-windings of the motors and at this change of connections to insert resistance in the circuit of the motor coils and windings and to increase the shunt-field strength.

37. A controller for the series-parallel control of electric motors of the kind herein referred to, comprising a set of moving contacts and a set of stationary contacts connected to various circuits, said moving contacts being so adapted as, when moved relatively to the stationary contacts, to alter the various circuits and so arranged as, when moved in one direction, first to close the shunt field-circuit and bring the fields to their maximum excitation, then to close the armature-circuit through resistance with the armatures in series, to withdraw the said resistance gradually, and to reduce the field excitation, then to place the armatures in parallel and in series with the series field-windings and at this change of connections to insert resistance in the armature-circuit and to increase the shunt-field strength, thus preventing rush of current through the motor coils and windings and when the parallel connections are made removing the resistance from the armature-circuit.

38. A controller for the series-parallel control of electric motors of the kind herein referred to, comprising a set of moving contacts and a set of stationary contacts connected to various circuits, said moving contacts being so adapted as, when moved relatively to the stationary contacts, to alter the various circuits and so arranged as, when moved in one direction to close first the shunt field-circuit and bring the fields to their maximum excitation, then to close the armature-circuit through resistance with the armatures in series, to withdraw the said resistance gradually and to reduce the shunt-field excitation, then to place the armatures in parallel and in series with the series field-windings and after the motors are placed in parallel to remake the series connections and at this change of connections to close the circuit for preventing the braking effect thereby produced by a change in the condition of the armature-circuit.

39. A controller for the series-parallel control of electric motors of the kind herein referred to, comprising a set of moving contacts and a set of stationary contacts connected to various circuits, said moving contacts being so adapted as, when moved relatively to the stationary contact, to alter the various circuits and so arranged as, when moved in one direction, first to close the shunt field-circuit and bring the fields to their maximum excitation, then to close the armature-circuit through resistance with the armatures in series, to withdraw the resistance gradually and to reduce the shunt-field excitation, then to place the armatures in parallel and in series with the series field-windings and after the motors are placed in parallel to remake the series connections and at this change of connections to close the circuit for preventing the braking effect thereby produced by a change in the condition of the armature-circuit and when the series connections are made removing the means by which such change in the condition of the armature-circuit is brought about.

40. A controller for the series-parallel control of electric motors of the kind herein referred to, comprising a set of moving contacts and a set of stationary contacts connected to various circuits, said moving contacts being so adapted as, when moved relatively to the stationary contacts, to alter the various circuits and so arranged as, when moved in one direction, first to close the shunt field-circuit and bring the fields to their maximum excitation, then to close the armature-circuit through resistance with the armatures in series, to withdraw the said resistance gradually and to reduce the shunt-field excitation, then to place the armatures in parallel and in series with the series field-windings and after the motors are placed in parallel to remake the series connections and at this change of connections to close the circuit for preventing the braking effect thereby produced by the insertion of resistance in the armature-circuit.

41. A controller for the series-parallel control of electric motors of the kind herein referred to, comprising a set of moving contacts and a set of stationary contacts connected to various circuits, said moving contacts being so adapted as, when moved relatively to the stationary contacts, to alter the various circuits, and so arranged as, when moved in one direction, first to close the shunt field-circuit and bring the fields to their maximum excitation, then to close the armature-circuit through resistance with the armatures in series, to withdraw the said resistance gradually and to reduce the shunt-field excitation, then to place the armatures in parallel and in series with the series field-windings and after the motors are in parallel and the moving contacts are moved reversely to remake the series connections and at this change of connections to close the circuit for preventing the braking effect thereby produced by the insertion of resistance in the armature-circuit and when the series connections are made removing this resistance from the armature-circuit.

42. A controller for the series-parallel control of electric motors of the kind herein referred to, comprising a set of moving contacts and a set of stationary contacts connected to various circuits, said moving contacts being so adapted as, when moved relatively to the stationary contacts, to alter the various circuits and so arranged as, when moved in one direction, first to close the shunt field-circuit and bring the fields to their maximum excitation, then to close the armature-circuit through resistance with the armatures in circuit, to withdraw the resistance gradually and to reduce the field excitation, then to place the armatures in parallel and in series with the series field-windings of the motors and after the motors are in parallel and on reversal of movement to remake the series connections and at this change of connections to alter the condition of the shunt field-circuit.

43. A controller for the series-parallel control of electric motors of the kind herein referred to, comprising a set of moving contacts and a set of stationary contacts connected to various circuits, said moving contacts being so adapted as, when moved relatively to the stationary contacts, to alter the various circuits and so arranged as, when moved in one direction, first to close the shunt field-circuit and bring the fields to their maximum excitation, then to close the armature-circuit with the armatures in series and through resistance, to withdraw the resistance gradually and to reduce the excitation of the shunt-fields, then to place the armatures in parallel and in series with the series field-windings of the motors and after the motors are in parallel and on reversal of movement to remake the series connections and at this change of connections to reduce the excitation of the shunt-fields.

44. A controller for the series-parallel control of electric motors of the kind herein referred to, comprising a set of moving contacts and a set of stationary contacts connected to various circuits, said moving contacts being so adapted as, when moved relatively to the stationary contacts, to alter the various circuits and so arranged as, when moved in one direction first to close the shunt field-circuit and bring the fields to their maximum excitation, then to close the armature-circuit through resistance and with the armatures in series, to withdraw the resistance gradually and to reduce the shunt-field excitation, then to place the armatures in parallel and in series with the series field-windings of the motors and after the armatures are in parallel and on reversal of movement to remake the series connections and at this change of connections to insert resistance in the armature-circuit.

45. A controller for the series-parallel control of electric motors of the kind referred to, comprising a set of moving contacts and a set of stationary contacts connected to various circuits, said moving contacts being so adapted as, when moved relatively to the stationary contacts, to alter the various circuits and so arranged as, when moved in one direction, first to close the shunt field-circuit and bring the fields to their maximum excitation, then to close the armature-circuit through resistance with the armatures in series, to withdraw the resistance gradually and to reduce the shunt-field excitation, then to place the armatures in parallel and in series with the series field-windings of the motors and after the motors are in parallel and on reversal of movement to remake the series connections and at this change of connections to insert resistance in the armature-circuit and reduce the shunt-field excitation.

46. A controller for the series-parallel control of electric motors of the kind herein referred to, comprising a set of moving contacts and a set of stationary contacts connected to various circuits, said moving contacts being so adapted as, when moved relatively to the stationary contacts, to alter the various circuits and so arranged as, when moved in one direction first to close the shunt field-circuit and bring the fields to their maximum excitation, then to place the armatures in parallel and in series with the series field-windings of the motors and after the motors are in parallel and on reversal of movement to remake the series connection and at this change of connections to insert resistance in the armature-circuit and when the series connections are made to remove the resistance from the armature-circuit.

47. A controller for the series-parallel control of electric motors of the kind herein referred to, comprising a set of moving contacts and a set of stationary contacts connected to various circuits, said moving contacts being so adapted as, when moved relatively to the stationary contacts, to alter the various circuits and so arranged as, when moved in one direction first to close the shunt field-circuit and bring the fields to their maximum excitation, then to close the armature-circuit through resistance and with the armatures in series, to withdraw the resistance gradually and to reduce the shunt-field excitation, then to place the armatures in parallel and in series with the series field-windings of the motors and after the armatures are in parallel and on reversal of movement to remake the series connections and at this change of connections to insert resistance in the armature-circuit and reduce the shunt-field excitation and when the series connections are made to remove the resistance from the armature-circuit.

48. A controller for the series-parallel control of electric motors of the kind herein referred to, comprising a set of moving contacts and a set of stationary contacts connected to various circuits, said moving contacts being adapted when moved relatively to the stationary contacts to alter the various circuits, floating contacts loosely connected to said moving contacts and arranged to be moved over some of said stationary contacts and an operating-pin for engaging and positively driving the floating-contacts carrier.

49. A controller for the series-parallel control of electric motors of the kind herein referred to, comprising a set of moving contacts and a set of stationary contacts connected to various circuits, said moving contacts being adapted when moved relatively to the stationary contacts to alter the various circuits and floating contacts loosely connected to and adapted to be moved along with said moving contacts and arranged to be moved over some of said stationary contacts.

50. A controller for the series-parallel control of electric motors of the kind herein referred to, comprising a set of moving contacts and a set of stationary contacts connected to various circuits, said moving contacts being adapted when moved relatively to the stationary contacts to alter the various circuits, and floating contacts adapted during one part of the movement of said moving contacts to remain stationary and then to be moved at the same time as said moving contacts over some of said stationary contacts.

51. A controller for the series-parallel control of electric motors of the kind herein referred to, comprising a set of moving contacts and a set of stationary contacts connected to various circuits, said moving contacts being adapted when moved relatively to the stationary contacts to alter the various circuits, and floating contacts adapted during one part of the movement of said moving contacts to remain stationary and then to be connected to and moved at the same time as said moving contacts over some of said stationary contacts.

52. A controller for the series-parallel control of electric motors of the kind herein referred to, comprising a set of moving contacts and a set of stationary contacts connected to various circuits, said moving contacts being adapted when moved relatively to the stationary contacts to alter the various circuits, and floating contacts adapted during a part of the movement of said moving contacts to remain stationary and then to be connected to and moved by said moving contacts over some of the said stationary contacts.

53. A controller for the series-parallel control of electric motors of the kind herein referred to, comprising a set of stationary contacts connected to various circuits to be controlled, a set of moving contacts carried by a main barrel and a floating ring or rings loosely connected to said main barrel, for the purpose specified.

54. A controller for the series-parallel control of electric motors of the kind herein referred to, comprising a set of stationary contacts connected to various circuits to be controlled, a set of moving contacts carried by a main barrel and a floating ring or rings loosely mounted on said main barrel for the purpose specified.

55. A controller for the series-parallel control of electric motors of the kind herein referred to, comprising a set of stationary contacts connected to various circuits to be controlled, a set of moving contacts carried by a main barrel and a floating ring or rings loosely connected to said main barrel and adapted at one part of the movement of the main barrel to remain stationary and then to be connected therewith and moved thereby for the purpose specified.

56. A controller for the series-parallel control of electric motors of the kind herein referred to, comprising a set of moving contacts carried by a main barrel and a set of stationary contacts connected to various circuits to be controlled and a floating ring or rings loosely mounted on said main barrel and adapted for a part of the movement of the main barrel to remain stationary and then to be connected therewith and moved thereby for the purpose specified.

57. A controller for the series-parallel control of electric motors of the kind herein referred to, comprising a set of stationary contacts connected to various circuits to be controlled and a set of moving contacts carried by a main barrel and a floating ring loosely connected to said moving contacts the connection comprising a pin carried by one part engaging and moving in a slot in another part, said pin when it reaches the end of the slot connecting the two parts together so that they move as one.

58. A controller for the series-parallel control of electric motors of the kind herein referred to, comprising a set of stationary contacts connected to various circuits to be controlled, a set of moving contacts carried by a main barrel and a floating ring loosely connected to said moving contacts, the connection between said ring and moving contacts comprising a pin carried by an arm on the main barrel engaging and moving within a slot in the floating ring loosely mounted on the main barrel and driving said ring when the pin comes into contact with the end of the slot.

59. A controller for the series-parallel control of electric motors of the kind herein referred to, comprising a set of stationary contacts connected to various circuits to be controlled, a set of moving contacts, and slip-contacts, said moving contacts being arranged to be moved over some of said stationary contacts and said slip-contacts over the remainder of the stationary contacts during a portion only of the movement of the moving contacts and when so moved to short-circuit resistance in the armature-circuit.

60. A controller for the series-parallel control of electric motors of the kind herein referred to, comprisnig a set of stationary contacts connected to various circuits to be controlled, a set of moving contacts, and slip-contacts, said moving contacts being arranged to be moved over some of said stationary contacts and said slip-contacts over the remainder of the stationary contacts during a portion only of the movement of the moving contacts first to short-circuit resistance in the armature-circuit when the armatures are in series and after continued movement and the motors are being placed in parallel to remove the short circuit on the resistance and afterward, when the motors are in parallel to short-circuit such resistance.

61. A controller for the series-parallel control of electric motors of the kind herein referred to, comprising a set of stationary contacts connected to various circuits to be controlled, a set of moving contacts, and slip-contacts, said moving contacts being arranged to be moved over some of said stationary contacts and said slip-contacts over the remainder of the stationary contacts during a portion only of the movement of the moving contacts and when so moved first to remove resistance from the armature-circuit when the armatures are in series and after continued movement and the motors are being placed in parallel to insert resistance and afterward, when the motors are in parallel to remove such resistance.

62. A controller for the series-parallel control of electric motors of the kind herein referred to, comprising a set of stationary contacts connected to various circuits to be controlled, a set of moving contacts and slip-contacts, said moving contacts being arranged to be moved over some of said stationary contacts and the slip-contacts over the remainder of the stationary contacts during a portion only of the movement of the moving contacts, said slip-contacts when the moving contacts are moved in a direction to place the motors in series first placing resistance in the armature-circuit, said resistance being greater than that placed in circuit thereby when going into parallel and then when the motors are in series removing said resistance from the armature-circuit.

63. A controller for the series-parallel control of electric motors of the kind herein referred to, comprising a set of stationary contacts connected to various-circuits to be controlled, a set of moving contacts and slip-contacts, said moving contacts being arranged to move over some of the stationary contacts and said slip-contacts over the remainder of the stationary contacts during a portion only of the movement of the moving contacts, said slip-contacts when the moving contacts are moved in a direction to place the motors in series first removing a short circuit on resistance in the armature-circuit, such resistance so inserted in circuit being greater than that inserted in circuit when going into parallel and then when the motors are in series short-circuiting said resistance.

64. The herein-described improved method of regulating the power and speed of mechanism driven by a plurality of electric motors, consisting in inserting resistance in the armature-circuit while the motor connections are being changed from series to parallel and the motor-fields are at a maximum.

65. The herein-described improved method of regulating the power and speed of mechanism driven by a plurality of electric motors, consisting in inserting resistance in the armature-circuit while the motor connections are being changed from series to parallel and the motor-fields are at a maximum, and on changing back from parallel to series inserting a greater amount of resistance in the armature-circuit.

66. The herein-described improved method of regulating the power and speed of mechanism driven by a plurality of electric motors, consisting in first closing the shunt field-circuit to bring the fields to their maximum excitation, then closing the armature-circuit through the resistance with the armatures in series, gradually withdrawing said resistance and then breaking the series connection of the armatures with one another and establishing the parallel connection thereof but in series with the series field-windings.

67. The herein-described improved method of regulating the power and speed of mechanism driven by a plurality of electric motors, consisting in first closing the shunt field-circuit and bringing the fields to their maximum excitation, closing the armature-circuit through resistance with the armatures in series, withdrawing the resistance gradually, breaking the armature-circuit and inserting resistance therein, and then remaking the armature-circuit with the armatures in parallel and in series with the series field-windings of the motors.

68. The herein-described improved method of regulating the power and speed of mechanism driven by a plurality of electric motors, consisting in bringing the fields to their maximum excitation, inserting resistance in the circuit of the armatures in series, reducing the field excitation, increasing the strength of the shunt-fields, inserting resistance in the armature-circuit and connecting up the armatures in parallel and in series with the series field-windings, and reducing the shunt field excitation, and reversely increasing the strength of the shunt-field, breaking the armature-circuit, reducing the strength of the shunt-field, inserting increased resistance in the armature-circuit, placing the armatures in series, cutting out said resistance, and increasing the shunt field excitation.

Dated this 4th day of January, 1906.

JOHN SMITH RAWORTH.

Witnesses:
    FREDK. L. RANDS,
    H. D. JAMESON.